United States Patent [19]

Jaffee

[11] Patent Number: 6,043,169
[45] Date of Patent: Mar. 28, 2000

[54] NONWOVEN RF REFLECTING MATS AND METHOD OF MAKING

[75] Inventor: Alan Michael Jaffee, Bowling Green, Ohio

[73] Assignee: Johns Manville International, Inc., Denver, Colo.

[21] Appl. No.: 08/923,188

[22] Filed: Sep. 4, 1997

[51] Int. Cl.$^7$ .................................................. B32B 17/04
[52] U.S. Cl. .......................... 442/180; 442/377; 442/379; 442/380; 428/902
[58] Field of Search .................................. 442/180, 377, 442/379, 380; 428/902

[56] References Cited

U.S. PATENT DOCUMENTS

| | | | |
|---|---|---|---|
| 4,486,490 | 12/1984 | Patz et al. ................................ | 428/245 |
| 4,784,899 | 11/1988 | Ono et al. ................................ | 428/236 |
| 4,885,659 | 12/1989 | Nowell et al. .......................... | 361/212 |
| 4,929,495 | 5/1990 | Stanislawczyk ........................ | 428/288 |
| 4,973,514 | 11/1990 | Gamble et al. ......................... | 428/297 |
| 5,316,846 | 5/1994 | Pinsky et al. ........................... | 428/379 |
| 5,595,801 | 1/1997 | Fahy et al. .............................. | 428/40.1 |

*Primary Examiner*—Terrel Morris
*Assistant Examiner*—Cheryl Juska
*Attorney, Agent, or Firm*—Robert D. Touslee

[57] ABSTRACT

A method of making a fibrous, nonwoven electrically conductive mat particularly suited for use in making a glass fiber reinforced product is disclosed. The mat contains a majority of glass fibers with a majority of the glass fibers having a conductive material like an aluminum coating on at least a part of the surface of the glass fibers. The fibers are bonded together with a stretchable resin binder when the mat is to be used to mold a part having a complex curved surface, and a conventional binder when the mat is intended for flat or simple curved parts. The mats of the invention have a surface resistivity of less than about one million ohms/Sq. and usually less than 500 ohms/Sq. and are particularly useful in the manufacture of satellite antenna dishes.

16 Claims, No Drawings

NONWOVEN RF REFLECTING MATS AND METHOD OF MAKING

BACKGROUND

It is desirable to use a fiberglass mat to reinforce an organic polymer matrix, or plastics, to provide the resultant products with dimensional stability, strength and toughness. When used to make complex curved, curved in more than one direction, or deep drawn parts, it is necessary that the bond between glass fibers is sufficiently elastic to allow the mat to stretch or compress to the dimension of the part being made. Chopped strand mat and continuous strand mat have traditionally been used for making such parts in the past. These mats are made by bonding strands, made up of about 20 or more chopped or continuous fibers, with a binder that will dissolve in or be softened by the polymer matrix that the mat will reinforce, or in the alternative the bonds holding the fiber strands together are so weak that many will be broken by the stress from forming the reinforced part, allowing the some or all of the fiber strands to move with the polymer matrix surrounding the fiber bundles.

It is desirable to use nonwoven mats made from a wet process which disperses the fibers to form a web of crisscrossing monofilaments containing at most only a small percentage of bundles of only a few fibers. Such nonwoven mats are usually more uniform in basis weight, weight of mat per unit area, than chopped strand mats or continuous strand mats, and are thinner. A problem with using such mats in such an application has been that they do not stretch or compress with the forming stresses, but instead tend to tear or to crease and fold, all of which are unacceptable for a reinforcing mat. This occurs because the binders used to hold the mono-filaments together do not have the necessary elasticity, even when coated with the polymer matrix. It is known to use a binder that dissolves in styrene to allow the bonds to be broken and the fibers to move, but this often leads to torn mat or mat that has too little strength to perform in the molding or forming process.

When making parts that require electrically conductive surfaces and/or interior, it has been common practice to add a conductive agent like carbon or metal powder or carbon fiber to the polymer matrix or to add carbon fibers to a nonwoven web or mat, such as shown in U.S. Pat. No. 5,368,913. This patent discloses a process in which a plurality of electrically conductive filaments are distributed into a nonwoven fabric as the fabric is being made. The filaments can be carbon or metal. The problem with such a process for making a conductive mat is that if enough conductive fibers are used to make a web having uniform conductive properties, the web takes on the characteristics of the conductive fibers instead of the non conductive fibers which are desired. Also, the conductive fibers tend to be denser and/or more expensive than the non conductive fibers, thus making the mat heavier and more expensive than feasible. Finally, carbon fiber is not suitable for making antenna dishes because the carbon fiber absorbs the signal waves instead of reflecting the signal which is essential.

It is also known to use metallized resin fibers as conductive fibers in a nonwoven material as disclosed in U.S. Pat. No. 5,202,536. Currently satellite antenna dishes are made with sheet molding compound and a woven metal wire screen or perforated metal sheet, but these conductive materials are expensive and difficult to mold. It would be preferable to use a conductive fiber glass nonwoven mat because of its lower cost and desired compatibility with SMC compound instead of the metal screen or perforated sheet, but such a conductive fiber glass mat is not available. Also, while the metal woven screen and perforated metal sheet will stretch to form a complex curve like a dish antenna, conventional fiber glass mats do not stretch enough to permit such a molded shape.

For making satellite dishes like the mini-dishes that are currently popular for residential use, it would be desirable to have a nonwoven glass fiber reinforcing mat that is conductive and that will stretch or compress with the forming stresses. It would also be desirable to have a conductive fiber glass mat that can be used to make anti-static wall coverings and carpet, RF shielding for military uses, computer enclosures, electronic uses and automotive uses.

SUMMARY OF THE INVENTION

The present invention involves the process of making a nonwoven mat comprising a majority of glass fibers, a majority of the glass fibers having a metallic conductive material, such as aluminum, on their surfaces. The fibers can be bonded together with an elastic binder that allows the fibers to move apart or together when stressed in a forming process, or with a conventional binder for nonwoven mats when making a mat for making flat or simply curved products. The present invention also includes the resultant conductive fiber glass mats. The preferred process involves adding aluminum coated glass fibers, either alone or with a smaller portion of non conductive glass fibers, to a white water system of a wet forming system that disperses the fibers and forms a nonwoven web or mat on a collecting screen. This wet web is transferred to a binder application screen where the elastic binder, in latex form, is applied to the mat and the excess removed to leave the desired amount of binder therein. The bindered web or mat is then transferred to an oven belt where the mat is dried and the resin cured.

The resultant inventive mats comprise a major portion of glass fibers, a major portion of these glass fibers having a conductive surface such as a coating of a conductive material, such as aluminum, thereon, a minor portion of elastic binder bonding the fibers together at the places where two or more fibers cross each other, and optionally a minor portion of standard glass fibers and minor portions of one or more conductive powders and/or conductive fibers. The elastic binder can also contain a catalyst, another resin and other ingredients known to be added to binders for glass mats. The mats of the present invention have a maximum surface resistivity of one million, preferably below 0.5 million and most preferably below 300,000, such as below about 250,000 or even below about 100,000 such as below about 75,000 ohms/square. The most preferred mats have a surface resistivity of below about 55,000 ohms/Sq.

DETAILED DESCRIPTION OF THE INVENTION

Any glass fiber having a conductive surface such as any metallized glass fiber or metal coated glass fiber can be used in the present invention. However, carbon is not suitable for mats intended for antennas because carbon absorbs the signal. The preferred fiber is an aluminum coated E glass fiber available from Tracor Aerospace Corporation of Lillington, N.C., under the name of Metafil™. This fiber is currently used militarily as chaff to confuse radar. The fiber can be half coated or full coated with conductive material like aluminum. Each half coated Metafil™ fiber is coated continuously along its length, but only half way around its circumference. Fully coated Metafil™ fiber can be used, but is more brittle and more expensive. The preferred Metafil™ product is only half coated.

The preferred Metafil™ fiber has a fiber diameter of about 20 microns and a length of 1.25 inch. Other lengths, including one inch, and other fiber diameters can be used. The fiber length should be longer than the wave length of the signal encountered in the application. Longer fibers generally provide more strength in molded parts than shorter fibers. The preferred glass is E type glass, which is well known and is a calcium alumino-borosilicate glass, but any type of glass can be used for the fiber including those with high alkali contents.

Any type glass fiber is suitable for use as the optional non conductive glass fiber. A preferred product is K117 fiber, a 13 micron E glass fiber available from Johns Manville International, Inc.

When making a mat for coating with a polymer matrix and molding reinforced plastic products having a complex curved surface like a satellite dish, or requiring a deep draw, the binder needs to be elastic (stretchable) and to be compatible with the polymer matrix that the nonwoven mat will reinforce. A particularly preferred binder for use in the present invention is Hystretch™ V29, a modified acrylic latex available from the B. F. Goodrich Company of Akron, Ohio, having a glass transition temperature of minus 29 degrees C. This binder and its method of manufacture are disclosed in U.S. Pat. No. 5,143,971 and further shown in U.S. Pat. No. 4,929,495, the disclosure of both of these patents and the applications they depend from being hereby incorporated herein by reference. This binder is predominantly acrylate-containing, crosslinked polymer chains including repeating units derived from itaconic acid and an acrylate represented by the structure

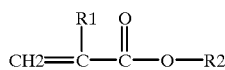

wherein,

R1 is hydrogen or methyl;

R2 represents C1–C20 alkyl, C2–C7 alkokyalkyl, C2–C7 alkylthioalkyl, or C2–C7 cyanoalkyl;

said crosslinking is effected by a crosslinking monomer present in an amount in the range from 0.1 phr (parts by weight based on 100 parts of monomers in the latex) to 20 phr;

said itaconic acid is present in the range from about 1 phr to about 20 phr; at least 40 phr of said acrylate in said polymer is present as an alkyl acrylate in which alkyl is C4–C8; said polymer being in an aqueous emulsion form. The concentration of solids in the emulsion or latex as received is about 50 weight percent. This concentration is preferably further diluted to about 22–25 wt. percent using water or whitewater from the wet mat machine. Conventional whitewater compositions are used, particularly those having a small amount of viscosity builder like a methyl cellulose and a smaller amount of a cationic dispersant, though whitewater containing anionic dispersants and nonionic dispersants are suitable as long as they disperse the fiber adequately.

The preferred binder composition is a mixture containing about 88 percent V29 Hystretch™, about 11.5 percent Aerotex™ 3030, a melamine formaldehyde resin available from the Freedom Textile Chemical Company of Charlotte, N.C., and about 0.5 percent diammonium phosphate, the latter ingredient serving as a curing catalyst. The binder mixture can also contain a conductive material like Permablack™, a carbon powder slurry available from the Monochem Corporation of Atlanta, Tex. and/or Aquasil™, a conductive slurry containing aluminum flake pigment or any other conductive powder or slurry; but these are optional and are not an essential ingredient of the inventive mats for antenna dish use. Pigments add to electrical conductivity and reduce surface resistivity for static dissipation applications.

When making a conductive mat for use as wall paper or a paintable wall paper or wall covering, a backing for carpet or carpet tiles and other uses such as for use in molding a reinforced plastic flat product or a product having a curvature in only one direction, any conventional non-woven mat binder is suitable. Examples of such binders are urea formaldehyde, melamine formaldehyde, acrylic, polyester, etc.

Any wet process for making nonwoven fiber glass mats can be used to make the mats of the present invention. For example, in a conventional wet laid process as described in U.S. Pat. Nos. 3,758,375, 3,766,003, 4,112,174, and 5,158,824, the disclosures of which are incorporated herein by reference, a slurry of glass fiber is made by adding glass fibers to a vat of typical white water and having a pulper or stirrer to disperse the fibers in the white water forming a slurry having a fiber concentration of about 0.1 percent. On a Voith Hydroformer™, or the resultant slurry is metered into a loop flow of white water and on into a headbox and over a moving forming wire to dewater the slurry and to form a wet nonwoven fibrous mat. Alternative forming methods include the use of well known wet cylinder forming or "dry laying" forming using carding or random fiber distribution.

The wet nonwoven mat of glass fiber is then transferred to a second moving screen and run through a binder application saturating station where a latex binder of the type described above is applied to the mat. This is followed by sucking off the excess binder and drying the unbonded, wet mat and curing (polymerizing) the polymer binder to bond the fibers together in the mat with an elastic bond. Preferably, the aqueous binder solution is applied using a curtain coater or a dip and squeeze applicator. In the drying and curing oven the mat is subjected to temperatures of 250–450 or 500 degrees F. for periods usually not exceeding 4 or 5 minutes to produce a cured, flexible, nonwoven fiber glass mat.

The mats of the present invention are particularly suited for saturating with a resin in processes such as sheet molding compound (SMC) molding, reactive injection molding (RIM) and other similar molding processes into parts having relief or a curved portion, like a mini-satellite antenna for receiving TV signals, etc. The elastic binder in these mats allows the mat to stretch or compress as needed to fit the contour of the shape without tearing or crumpling the mat, which happens with conventional fiber glass mats which are bound with a relatively rigid binder. The mats of the present invention have a maximum surface resistivity of one million, preferably below 0.5 million and most preferably below 300,000, such as below about 250,000 or even below about 50,000 ohms/square.

The mats need to have adequate tensile strength for handling and packaging which generally is at least about 10 lbs. per three inch width in both the machine and the cross machine directions. Preferably the machine direction tensile strength is at least 25 lbs. per three inch width and most preferably at least 35 lbs. per three inch width.

EXAMPLE 1

A preferred embodiment of the invention was made by adding aluminum coated fiber, one-half the surfaces of fibers were coated with aluminum metal, called Metafil™ to a conventional white water system in a pulper of a wet mat forming machine like a Voith Hydroformer™. The fibers were dispersed and sent to a forming box where a mat of nonwoven fibers is continuously formed in a known wet mat making process, as disclosed in U.S. Pat. Nos. 3,758,375, 3,766,003, 4,112,174, and 5,158,824 and other similar patents, on a moving mesh belt. In these examples, the mats were made on a pilot machine that simulates everything that the large production machines do except that the ratio of tensile strength in the cross machine direction to tensile strength in the machine direction is greater. This difference results from the line speed of the pilot machine being substantially lower than that of the production machine and not high enough to achieve the desired MD:CMD tensile ratio.

The wet mat was transferred to another moving mesh belt on a binder applicator section of the machine where a binder was applied to the mat with a curtain coater applicator. B. F. Goodrich's Hystretch™ V-29 latex was used as the binder after diluting to about 23 percent solids with the whitewater from the mat machine. After the binder had been applied to saturate the wet mat, the mat was continuously run over a vacuum knife in a known manner to suck off the excess binder to leave the desired amount of about 20 wt. percent, based on the dry weight of the mat. The wet mat, containing the binder, was then transferred to an oven belt where it was dried and cured reaching a temperature of about 300 to 450 degrees F. The drying and curing time is typically less than 30 seconds, but shorter or longer times can be used as long as adequate binder cure is achieved. The weight of the fiber mat and the binder were controlled to produce a dry, cured mat having a basis weight of about 2.3 lbs. per 100 square feet, but other basis weights are suitable depending on the intended application. This mat worked good for making molded plastic antenna like satellite dishes where the mat provided the radio or signal wave reflector and also some reinforcement for the plastic.

EXAMPLE 2

This most preferred mat was made exactly like the mat of Example 1, except instead of the diluted V 29 binder used in Example 1, a binder mixture containing 88 wt. percent of the diluted Hystretch™ V-29 resin latex, about 11.5 percent Aerotex 3030 melamine formaldehyde resin and about 0.5 percent diammonium phosphate as a curing catalyst was used as the binder, and the basis weight was about 1.9 lbs./100 sq. ft. This mat worked good for making molded plastic satellite dishes where the mat provided the radio or signal wave reflector and also some reinforcement for the plastic.

EXAMPLE 3

This mat was made in the same manner as the mat made in Example 1 except that the fiber portion of the mat contained only 80 wt. percent of the Metafil™ fibers and 20 wt. percent of non conductive, ¾ inch long standard 13 micron E glass fibers. The basis wt. of this mat was about 2.3 lbs./100 sq. ft. This mat worked good for making molded plastic satellite dishes where the mat provided the radio or signal wave reflector and also some reinforcement for the plastic.

EXAMPLE 4

This mat was made in the same manner as the mat made in Example 1 except that the binder mixture contained 8 weight percent of Aquasil™ AN 2750 aluminum flake pigment, based on the solids of the V-29 resin. The basis weight of this mat was about 2.1 lbs./100 sq. ft. This mat worked for making molded plastic satellite dishes where the mat provided the radio or signal wave reflector and also some reinforcement for the plastic.

EXAMPLE 5

This mat was made in the same manner as the mat made in Example 1 except that the binder mixture contained 8 weight percent of Permablack™ 998 carbon powder slurry, based on the solids of the Hystretch™ V-29 resin. The basis weight of this mat was about 2.1 lbs./100 sq. ft. This mat worked for making molded plastic satellite dishes where the mat provided the radio or signal wave reflector and also some reinforcement for the plastic.

EXAMPLE 6

This mat was made in the same manner as the mat made in Example 3 except that the E glass fibers half coated with aluminum were only ¾ inch long, and the binder used was a conventional urea formaldehyde (UF) latex, plasticized with a vinyl acrylic latex, and contained 16 wt. percent Permablack™ 998 carbon slurry, based on the weight of the resin solids in the binder. The binder had a solids content of about 23–25 weight percent before the pigment was added and contained about 76 wt. percent UF resin and about 24 wt. percent of a mixture of 91.7 wt. percent polyvinyl acetate homopolymer and about 8.3 wt. percent of an acrylic tripolymer. Any UF resin latex can be used, such as GP 2928 manufactured by Georgia Pacific of Atlanta, Ga. The basis weight of this mat was about 1.9 lbs./100 sq. ft. This mat can be used for making flat or slight single curvature products like slightly curved reinforced plastics, anti-static carpet, anti-static wall paper, etc., but is not suitable for making products having complex curvatures like satellite dishes or products requiring deep draws when molding.

The properties of mats made according to the above descriptions are as follows:

|  | Examples | | | | | |
|---|---|---|---|---|---|---|
| Property | 1 | 2 | 3 | 4 | 5 | 6 |
| Basis weight (lbs./100 sq. ft.) | 2.3 | 1.9 | 2.3 | 2.1 | 2.1 | 1.9 |
| Thickness (mils) | 36 | 28 | 32 | 30 | 35 | 30 |
| Binder content (wt. %) | 19.6 | 21.4 | 21 | 21.9 | 17.4 | 21.5 |
| MD* tensile (lbs./3 in.) | 12.5 | 19.6 | 16.2 | 17.4 | 17.3 | 79 |
| CMD** tensile (lbs./3 in.) | 13.3 | 19.5 | 22.8 | 17.8 | 19.4 | 113 |
| Cure (%) | 65 | 43 | 51 | 51 | 44 | 59 |
| Surface resistivity (ohms/Sq. × 1,000) | 27 | 460 | 210 | 270 | 136 | 50 |
| Styrene resistance (% tensile retention)*** | 63.2 | 80.6 | 45 | ND | ND | ND |

*Machine direction as made
**Cross machine direction as made
*** Procedure consisted of soaking the center portion of the 3 inch wide strips of mat samples in styrene for 30 seconds and then running tensile tests.
ND means not determined.

Satellite antennas made with mat made like Example 2, but with a basis weight of 2.2 pounds per 100 square feet, had a signal loss of less than 0.1 decibel at a frequency range of about 10–15 GHz, which met specifications for the antenna.

EXAMPLE 7

The mat of Example 1 was made on a Voith Hydroformer™ production machine under production conditions.

The MD tensile was 44 lbs./3 in., the CMD tensile was 14 lbs./3 in. and the other properties were essentially the same as those given for Example 1. This mat worked good for making molded plastic satellite dishes where the mat provided the radio wave reflection and also some reinforcement for the plastic.

These types of conductive mats, particularly the mats of Examples 6 and 7, can also be used for an antistatic backing for carpet and carpet tiles and for application to walls to make them antistatic. Other potential applications include RF shielding for computers, membranes for electrostatic painting and other uses where the conductivity, reflectivity and/or glass fiber mat offers advantages over materials currently available. Mat made according to this invention for carpet or for walls or other flat surfaces or for molding flat objects or objects curved slightly in only one direction only need not have an elastic binder. For these applications the binder can be any conventional mat binder such as urea formaldehyde, melamine formaldehyde, acrylic, etc. The binders can also be mixed with one or more plasticizers such as polyvinyl acetate and acrylic resins in known ways for binding nonwoven glass fiber mats.

The mats of this invention, and particularly the mats for applications other than antennas, can contain conductive fillers and preferably up to about 25 weight percent, based on the weight of the conductive mat, of one or more conductive fillers or particulates like metal powder or flakes, carbon powder and other conductive materials. Other obvious modifications will be apparent to those skilled in this technology and those are intended to be included within the scope of the following claims.

What is claimed is:

1. A fibrous, nonwoven electrically conductive mat particularly suited for use in making a glass fiber reinforced product, said mat containing 10 to about 20 weight percent resin binder on a dry mat basis and a majority of glass fibers, a majority of the glass fibers being electrically conductive by having a conductive metallic coating on at least a part of the surface of the glass fibers, said electrically conductive glass fibers comprising 50–90 weight percent of the dry mat, said fibers bonded together with an elastic or stretchable resin binder, said resin binder containing predominantly acrylate containing crosslinked polymer chains including repeating units derived from itaconic acid and an acrylate, said mat having a surface resistivity of less than 500,000 ohms/Sq.

2. The mat of claim 1 wherein the fibers have an aluminum conductive coating on at least a part of their surface and comprise about 50–90 weight percent of the mat, the surface resistivity of the mat being less than about 300,000 ohms/Sq.

3. The mat of claim 2 wherein the mat also contains up to 25 weight percent non-conductive glass fibers.

4. The mat of claim 1 wherein the binder comprises about 20 weight percent and the conductive fibers comprise about 80 weight percent of the mat.

5. The mat of claim 4 wherein the basis weight of the mat is from about 1 to about 3 pounds per 100 square feet and the surface resistivity is less than about 50,000 ohms/Sq.

6. The mat of claim 1 wherein the mat also contains a particulate conductive material.

7. The mat of claim 4 wherein the mat also contains a particulate conductive material.

8. The mat of claim 5 wherein the mat also contains a particulate conductive material in an amount of up to 25 weight percent based on the weight of the dry mat.

9. A method of making a fibrous, nonwoven electrically conductive mat particularly suited for use in making a glass fiber reinforced product, said mat containing 10 to about 20 weight percent resin binder and a majority of glass fibers, a majority of the glass fibers being electrically conductive by having a metallic conductive material coating on at least a part of the surface of the glass fibers, said electrically conductive glass fibers comprising 50–90 weight percent of said mat, said fibers bonded together with said binder, the method comprising forming a nonwoven fibrous web containing said electrically conductive glass fibers, saturating the nonwoven web with a stretchable or elastic resin binder, removing the excess binder to leave a web containing 10 to about 20 weight percent of binder and 50–90 weight percent of said electrically conductive glass fibers on a dry mat basis, and drying and curing the web to form a conductive mat having a surface resistivity of less than 500,000 ohms/Sq., said resin binder containing predominantly acrylate containing crosslinked polymer chains including repeating units derived from itaconic acid and an acrylate.

10. The method of claim 9 wherein the fibers have an aluminum conductive coating on at least a part of their surface and comprise about 50–90 weight percent of the mat, the surface resistivity of the mat being less than about 300,000 ohms/Sq.

11. The method of claim 10 wherein the mat also contains up to 25 weight percent non-conductive glass fibers.

12. The method of claim 11 wherein the binder comprises about 20 weight percent and the conductive fibers comprise about 80 weight percent of the mat.

13. The method of claim 12 wherein the binder comprises about 20 weight percent of the dry mat, the fibers having a conductive surface comprise about 64 weight percent and the mat also contains about 16 percent non-conductive glass fibers.

14. The method of claim 12 wherein the basis weight of the mat is from about 1 to about 3 pounds per 100 square feet and the surface resistivity is less than about 50,000 ohms/Sq.

15. The method of claim 9 wherein the binder is a thermosetting resin or plasticized resin.

16. The method of claim 11 wherein the binder also contains a particulate conductive material.

* * * * *